US012525282B2

(12) United States Patent
Banerjee et al.

(10) Patent No.: US 12,525,282 B2
(45) Date of Patent: Jan. 13, 2026

(54) REDUCING CHARGE MIGRATION IN A MEMORY SYSTEM

(71) Applicant: Micron Technology, Inc., Boise, ID (US)

(72) Inventors: Amiya Banerjee, Karnataka (IN); Kranthi Kumar Vaidyula, Karnataka (IN); Jameer Mulani, Karnataka (IN)

(73) Assignee: Micron Technology, Inc., Boise, ID (US)

( * ) Notice: Subject to any disclaimer, the term of this patent is extended or adjusted under 35 U.S.C. 154(b) by 207 days.

(21) Appl. No.: 18/516,049

(22) Filed: Nov. 21, 2023

(65) Prior Publication Data

US 2024/0170052 A1    May 23, 2024

Related U.S. Application Data

(60) Provisional application No. 63/427,365, filed on Nov. 22, 2022.

(51) Int. Cl.
*G11C 11/4096* (2006.01)
*G11C 11/408* (2006.01)
*G11C 11/4093* (2006.01)

(52) U.S. Cl.
CPC ...... *G11C 11/4096* (2013.01); *G11C 11/4085* (2013.01); *G11C 11/4093* (2013.01)

(58) Field of Classification Search
CPC ............ G11C 11/4096; G11C 11/4085; G11C 11/4093
USPC .................................................. 365/189.011
See application file for complete search history.

(56) References Cited

U.S. PATENT DOCUMENTS

2021/0375374 A1* 12/2021 Das Purkayastha ... G11C 16/26
2021/0382638 A1* 12/2021 Anderson ............. G06F 3/0632

* cited by examiner

*Primary Examiner* — Anthan Tran
(74) *Attorney, Agent, or Firm* — Holland & Hart LLP

(57) ABSTRACT

Methods, systems, and devices for reducing charge migration in a memory system are described. The memory system may receive a command to program a first set of memory cells with first data. The memory system may generate a scrambling seed to scramble the first data. Before programming the scrambled data, the memory system may compare a first set of states in the scrambled data with a second set of states in second data to determine an aggregate difference between the sets of states. If the aggregate difference is less than a threshold, the memory system may program the first set of memory cells with the first data. If the aggregate difference is greater than a threshold, the memory system may generate a new scrambling seed to rescramble the first data and determine a new aggregate difference by comparing states of the rescrambled data to the states of the second data.

20 Claims, 6 Drawing Sheets

REDUCING CHARGE MIGRATION IN A MEMORY SYSTEM

CROSS REFERENCE

The present Application for Patent claims the benefit of and priority to U.S. Provisional Application No. 63/427,365 by Banerjee et al., entitled "REDUCING CHARGE MIGRATION IN A MEMORY SYSTEM," filed Nov. 22, 2022, assigned to the assignee hereof, and is expressly incorporated by reference in its entirety herein.

FIELD OF TECHNOLOGY

The following relates to one or more systems for memory, including reducing charge migration in a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
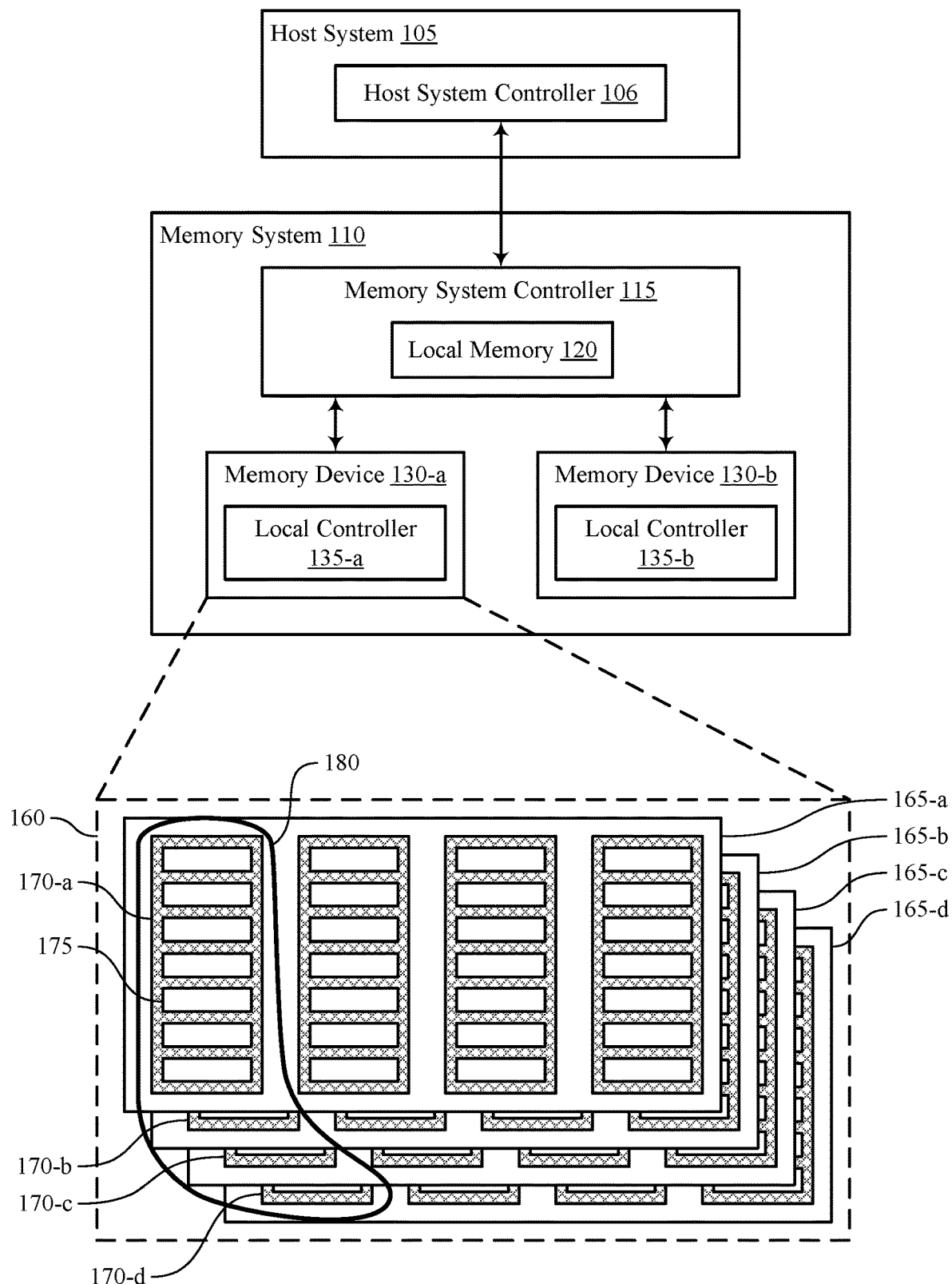
FIG. 1 illustrates an example of a system that supports reducing charge migration in a memory system in accordance with examples as disclosed herein.

A memory system may include one or more memory devices having memory cells that can each be used to store a state that includes multiple bits of data. For example, tri-level cell (TLC) may be configured to store a state representing three bits of data, a quad-level cell (QLC) may be configured to store a state representing four bits of data, or a penta-level cell (PLC) may be configured to store a state representing five bits of data. In some cases, two memory cells that are located near each other (which may be referred to as "neighboring" memory cells) may be programed to respective states with a difference in electron concentration in a charge trap layer of the memory device. The difference in electron concentration may create an electric field, which may lead to charge migration (e.g., movement of electrons in the charge trap layer). For example, a memory cell with a higher state may lose electrons and a memory cell with a lower state may gain electrons to reach equilibrium in the charge trap layer. Gain or loss of electrons may change a threshold voltage of a memory cell, which may increase a raw bit error rate (RBER) and thus reduce reliability at a memory device.

Systems, devices, and techniques are described to reduce charge migration in a memory system and improve reliability of the memory system. The memory system may receive a command to program a first set of memory cells with first data, where the first set of memory cells may be coupled with a first word line. The first set of memory cells may be located near a second set of memory cells coupled with a second word line, where second data may be stored at the second set of memory cells. The memory system may generate a scrambling seed to scramble the first data before programming the first set of memory cells with the first data. Before programming the scrambled data, the memory system may compare a first set of states in the scrambled data with a second set of states in the second data to determine an aggregate difference between the sets of states. If the aggregate difference is less than a threshold, the memory system may program the first set of memory cells with the first data. If the aggregate difference is greater than a threshold, the memory system may generate a new scrambling seed to rescramble the first data and determine a new aggregate difference by comparing states of the rescrambled data to the states of the second data. In some examples, the memory system may repeat rescrambling the first data until the aggregate difference is below the threshold, or until a quantity of comparison checks reaches a threshold quantity.

In addition to applicability in memory systems described herein, techniques for reducing charge migration may be generally implemented to improve security and/or data integrity features of various electronic devices and systems. As the use of electronic devices for handling private, user, or other information has become even more widespread, electronic devices and systems need to ensure appropriate data storage and integrity. Implementing the techniques described herein may improve the integrity of electronic devices and systems, along with data, by determining an aggregate difference between sets of states, and programming a first set of memory cells with first data if the aggregate difference is less than a threshold or generating a new scrambling seed to rescramble the first data and determine a new aggregate difference by comparing states of the rescrambled data to the states of the second data if the aggregate difference is greater than a threshold. This may reduce charge migration in a memory system and improve reliability of the memory system, among other benefits.

Figure 2:
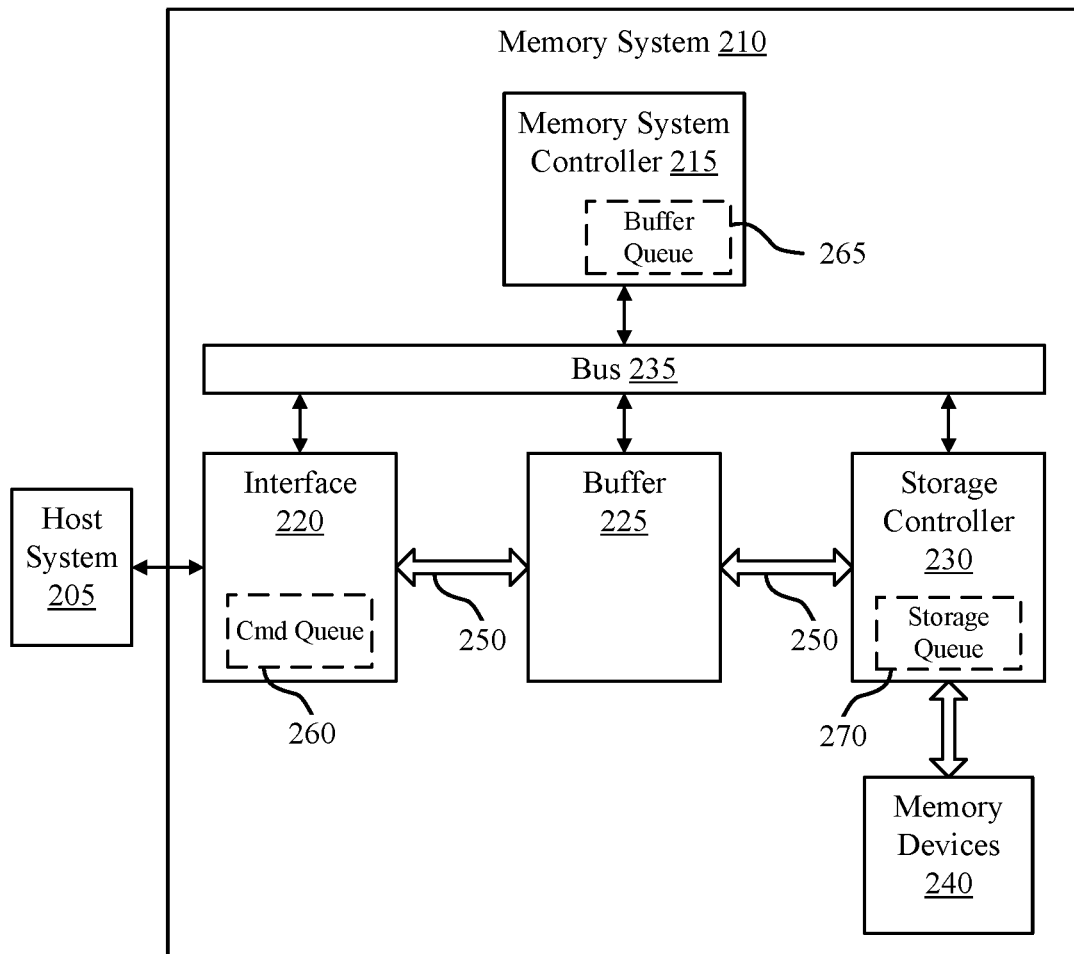
FIG. 2 illustrates an example of a system that supports reducing charge migration in a memory system in accordance with examples as disclosed herein.

Features of the disclosure are initially described in the context of systems, devices, and circuits with reference to FIGS. 1 through 2. Features of the disclosure are described in the context of a charge migration diagram and a process flow with reference to FIGS. 3 and 4. These and other features of the disclosure are further illustrated by and described in the context of an apparatus diagram and flowchart that relate to reducing charge migration in a memory system with reference to FIGS. 5 and 6.

FIG. 1 illustrates an example of a system 100 that supports reducing charge migration in a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support reducing charge migration in a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

As described herein, the memory system 110 may be configured to program memory cells with data based on states included in the data, which may reduce charge migration between neighboring memory cells. A memory controller (e.g., the memory system controller 115 or a local controller 135) of the memory system 110 may receive a command to program a first set of memory cells of a memory device 130 with first data, where the first set of memory cells may be coupled with a first word line. The first set of memory cells may be located near (e.g., be adjacent to) a second set of memory cells coupled with a second word line, where second data may be stored at the second set of memory cells. The memory controller may generate a scrambling seed to scramble the first data before programming the first set of memory cells with the first data. Before programming the scrambled data, the memory controller may compare a first set of states in the scrambled data with a second set of states in the second data to determine an aggregate difference between the sets of states. In some examples, the second data (or information associated with the second set of states) may be stored in a buffer, such as the local memory 120. If the aggregate difference is less than a threshold, the memory controller may program the first set of memory cells with the first data. If the aggregate difference is greater than a threshold, the memory controller may generate a new scrambling seed to rescramble the first data and determine a new aggregate difference by comparing states of the rescrambled data to the states of the second data. In some examples, the memory controller may repeat rescrambling the first data until the aggregate difference is below the threshold, or until a quantity of comparison checks reaches a threshold quantity.

FIG. 2 illustrates an example of a system 200 that supports reducing charge migration in a memory system in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230) may communicate with memory devices 240 directly or via a bus (not shown), which may include using a protocol specific to each type of memory device 240. In some cases, a single storage controller 230) may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250) through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240) and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270) may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270)) the location within the buffer 225 from which to obtain the data. The storage controller 230) may manage the locations within the memory devices 240 to store the data (e.g., performing wear-leveling, performing garbage collection). The entries may be added to the storage queue 270) (e.g., by the memory system controller 215). The entries may be removed from the storage queue 270) (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250). The storage controller 230) may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270) for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

As described herein, the memory system 210 may be configured to program memory cells with data based on states included in the data, which may reduce charge migration between neighboring memory cells. A memory controller (e.g., the memory system controller 215 or a storage controller 230) of the memory system 210 may receive a command to program a first set of memory cells of a memory device 240 with first data, where the first set of memory cells may be coupled with a first word line. The first set of memory cells may be located near (e.g., adjacent to) a second set of memory cells coupled with a second word line, where second data may be stored at the second set of memory cells. The memory controller may generate a scrambling seed to scramble the first data. Before programming the scrambled data, the memory controller may compare a first set of states in the scrambled data with a second set of states in the second data to determine an aggregate difference between the sets of states. In some examples, the second data (or information associated with the second set of states) may be stored in the buffer 225. If the aggregate difference is less than a threshold, the memory controller may program the first set of memory cells with the first data. If the aggregate difference is greater than a threshold, the memory controller may generate a new scrambling seed to rescramble the first data and determine a new aggregate difference by comparing states of the rescrambled data to the states of the second data. In some examples, the memory controller may repeat rescrambling the first data until the aggregate difference is below the threshold, or until a quantity of comparison checks reaches a threshold quantity.

Figure 3:
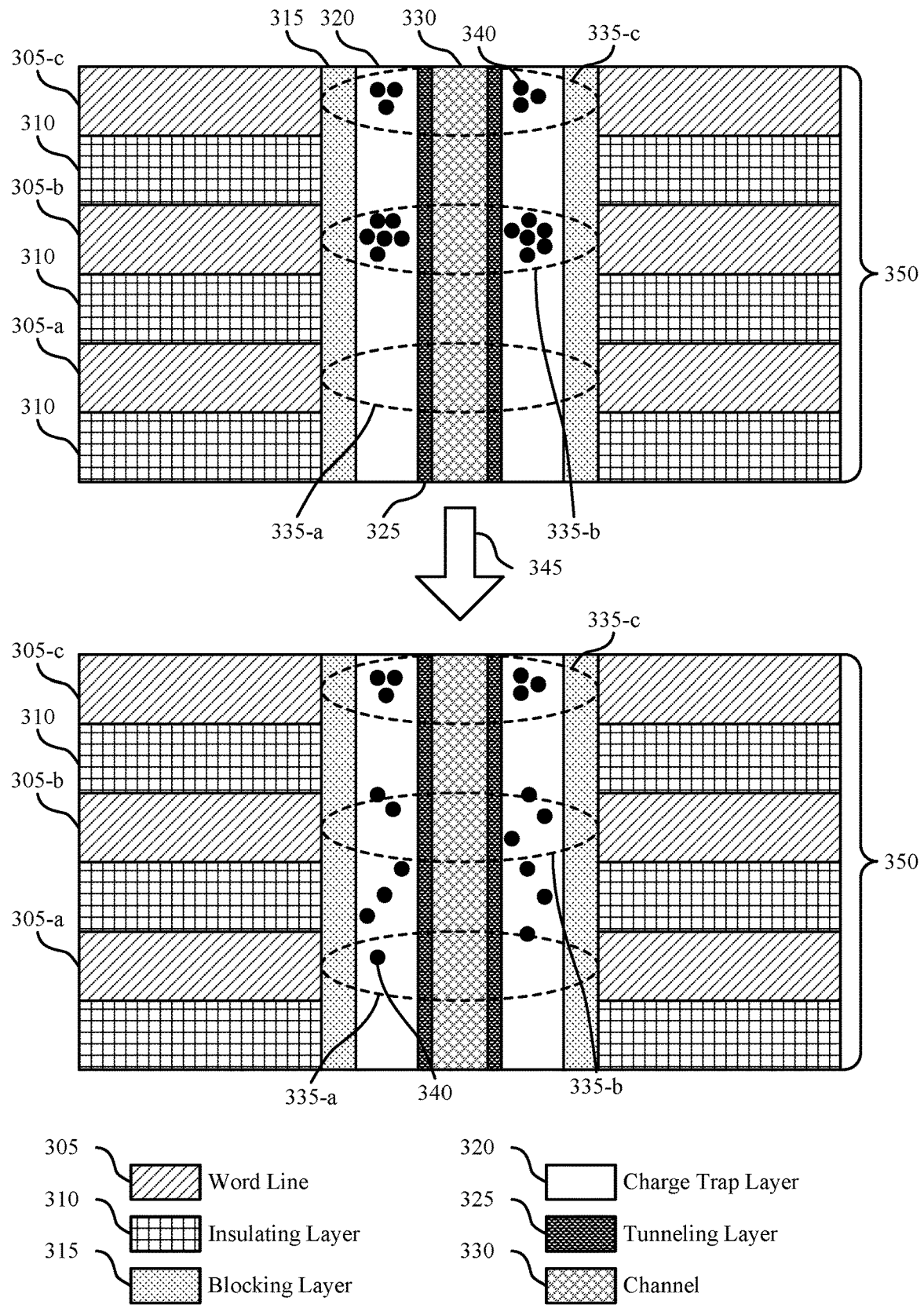
FIG. 3 illustrates an example of a charge migration diagram that supports reducing charge migration in a memory system in accordance with examples as disclosed herein.

FIG. 3 illustrates an example of a charge migration diagram 300 that supports reducing charge migration in a memory system in accordance with examples as disclosed herein. The charge migration diagram 300 depicts a memory cross-section 350 before and after a data retention process 345. The memory cross-section 350 may include a set of word lines 305 separated by insulating layers 310 (e.g., which may include an oxide material). The word lines 305 may be coupled with corresponding memory cells 335, where neighboring memory cells 335 (e.g., memory cells 335 located near one another, or coupled with adjacent word lines 305) may share a common blocking layer 315, charge trap layer 320, tunneling layer 325, and channel 330.

Each memory cell 335 may be a cell with multiple levels, where a programmed level of the memory cell 335 may be referred to as a state. For example, a QLC, which may be configured to store four bits of data, may be programmed to one of a set of sixteen states (e.g., {L0, L1, L2, . . . , L15}). A concentration of electrons 340 in a portion of the charge trap layer 320 may correspond to a state of the associated memory cell 335. For example, as illustrated in FIG. 3, a memory cell 335-a (coupled with a word line 305-a) may be erased (which may correspond to a state L0), a memory cell 335-b (coupled with a word line 305-b) may be programmed to a state L15, and a memory cell 335-c (coupled with a word line 305-c) may be programmed to a state L7.

In some examples, the difference in the concentration of electrons 340 may create an electric field in the charge trap layer 320, which may lead to charge migration (e.g., movement of the electrons 340) during the data retention process 345. The charge migration may be referred to as lateral charge migration, as the electrons 340 may move within the charge trap layer 320 (e.g., between the memory cells 335), but migration out of the charge trap layer 320 may be reduced due to the effects of the blocking layer 315 and the tunneling layer 325. The magnitude of the charge migration may be based on the difference between states of neighboring memory cells 335 (which may be referred to as a neighboring cell state difference (NCSD)), as shown in Table 1:

TABLE 1

| State in Previous Word Line 305 | State in New Data | Difference (NCSD) |
|---|---|---|
| L15 | L0 | 15 |
| L15 | L1 | 14 |
| L15 | L2 | 13 |
| L15 | L3 | 12 |
| L15 | L4 | 11 |
| L15 | L5 | 10 |
| L15 | L6 | 9 |
| L15 | L7 | 8 |
| L15 | L8 | 7 |
| L15 | L9 | 6 |
| L15 | L10 | 5 |

TABLE 1-continued

| State in Previous Word Line 305 | State in New Data | Difference (NCSD) |
|---|---|---|
| L15 | L11 | 4 |
| L15 | L12 | 3 |
| L15 | L13 | 2 |
| L15 | L14 | 1 |
| L15 | L15 | 0 |

As illustrated in FIG. 3, based on the difference between the state (L15) in the memory cell 335-b and the state (L0) in the memory cell 335-a, electrons 340 may move from the portion of the charge trap layer 320 associated with the memory cell 335-b toward the portion of the charge trap layer 320 associated with the memory cell 335-a. Based on this charge migration, if the states of the memory cell 335-a and 335-b are read following the data retention process 345, the read states may be different than those programmed. Additionally, or alternatively, gain or loss of electrons 340 may change a threshold voltage of a memory cell 335, which may increase an RBER, a fail bit count (FBC), or both, and thus reduce reliability of memory operations.

As described herein, a memory system may be configured to program memory cells 335 with data based on differences in states representing the data, which may reduce charge migration between neighboring memory cells 335. A memory controller of the memory system may receive a command to program a first set of memory cells 335 of a memory device with first data, where the first set of memory cells 335 may be coupled with a first word line 305 (e.g., the word line 305-a). The first set of memory cells 335 may be located near a second set of memory cells 335 coupled with a second word line 305 (e.g., the word line 305-b), where existing second data may be stored at the second set of memory cells 335, for example, based on a previous programming command. The memory controller may generate a scrambling seed (e.g., a random seed) to scramble the first data. Before programming the scrambled data, the memory controller may compare a first set of states in the scrambled data with a second set of states in the second data to determine an aggregate difference between the sets of states (e.g., based on the NCSDs shown in Table 1). In some examples, the second data (or information associated with the second set of states) may be stored in a buffer. If the aggregate difference is less than a threshold, the memory controller may program the first set of memory cells 335 with the first data. If the aggregate difference is greater than a threshold, the memory controller may generate a new scrambling seed to rescramble the first data and determine a new aggregate difference by comparing states of the rescrambled data to the states of the second data. In some examples, the memory controller may repeat rescrambling the first data until an aggregate difference is below the threshold, or until a quantity of comparison checks reaches a threshold quantity.

Figure 4:
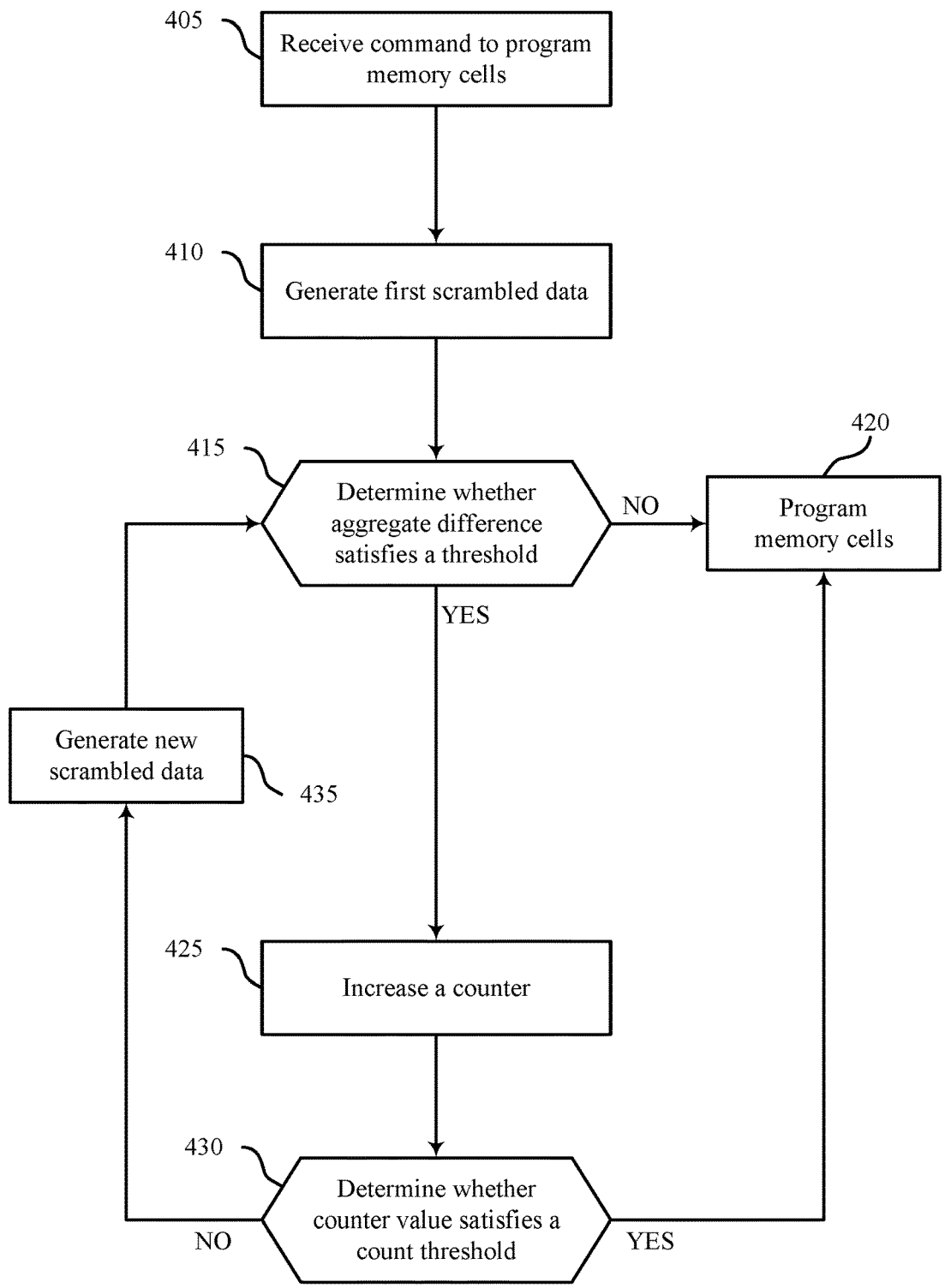
FIG. 4 illustrates an example of a process flow that supports reducing charge migration in a memory system in accordance with examples as disclosed herein.

FIG. 4 illustrates an example of a process flow 400 that supports reducing charge migration in a memory system in accordance with examples as disclosed herein. The process flow 400 may be performed by components of a memory system, such as a memory system 110 described with reference to FIGS. 1 and 2. For example, the process flow 400 may be performed by a controller of a memory system or a memory device (or both) such as a memory system controller 115 or a local controller 135, respectively, as described with reference to FIG. 1. The process flow 400 may be implemented to reduce charge migration and increase reliability of memory operations, among other benefits. In the following description of process flow 400, the operations may be performed in a different order than the order shown. For example, specific operations may also be left out of process flow 400, or other operations may be added to process flow 400.

By way of example, the process flow 400 may include receiving a command. For example, at 405, the memory system may receive a command to program a first set of memory cells coupled with a first word line with first data. The command may be associated with programming each cell of the first set of memory cells to one of three or more states. For example, each memory cell may be a QLC, and the command may be associated with programming each cell of the first set of memory cells to one of sixteen states (e.g., {L0, L1, L2, . . . , L15}). Additionally, or alternatively, each memory cell may be a PLC, and the command may be associated with programming each cell of the first set of memory cells to one of thirty-two states. In some examples, the command may be a write command.

In some examples, the process flow 400 may include generating first scrambled data. For example, at 410, in response to receiving the command at 405, the controller may generate the first scrambled data based on the first data and a first scrambling seed. In some examples, the first scrambling seed may be a random seed that is used to randomize the first data. In some examples, the first data may be scrambled with bits of a cyclic redundancy check (CRC), other data, or both.

In some examples, the process flow 400 may include determining whether an aggregate difference satisfies a threshold. For example, at 415, after generating the first scrambled data at 410, the controller may determine whether an aggregate difference between a first set of states associated with the first scrambled data and a second set of states associated with second data that is stored at a second set of memory cells coupled with a second word line satisfies a threshold. In some examples, the second word line may be near (e.g., adjacent to) the first word line, and each memory cell of the second set may be a neighboring cell of a corresponding memory cell of the first set. In some examples, the aggregate difference may be determined based on determining a set of differences (e.g., based on the differences listed in Table 1) between respective states of the first set of states and respective states of the second set of states. In some examples, a weighting function may be applied to the differences between respective states. For example, the weighting function may be a power function applied to differences between respective states, or a power function applied to a residual of the differences between respective states. For example, the differences between respective states may be squared prior to summing the differences, or a constant may be subtracted from each respective difference (e.g., with a floor of zero applied), prior to squaring the residual differences and summing the weighted differences.

In some examples, the aggregate difference may be determined based on determining the second set of states associated with the second data. For example, prior to receiving the command at 405, the memory controller may receive a previous command to program the second set of memory cells with the second data. In some examples, the second data (or other information associated with the second set of states) may be stored in a buffer, and the buffer may be read to determine the second set of states. Additionally, or alternatively, the second set of memory cells may be read to determine the second set of states.

In some examples, the process flow 400 may include programming the first set of memory cells with the first data based on determining at 415 that the aggregate difference does not satisfy the threshold. For example, at 420, the controller may program the first set of memory cells with the first set of states associated with the first scrambled data.

In some examples, the process flow 400 may include increasing a counter based on determining at 415 that the aggregate difference satisfies the threshold. For example, at 425, the controller may increase a counter associated with a quantity of comparison checks performed to determine the aggregate difference.

In some examples, the process flow 400 may include determining whether a value of the counter satisfies a count threshold. For example, at 430, after increasing the counter at 425, the controller may determine whether the value of the counter (e.g., corresponding to the quantity of comparison checks performed to determine the aggregate difference) is greater than or equal to a threshold quantity (e.g., four comparison checks). In some examples, the threshold quantity may be configured at the memory system.

In some examples, the process flow 400 may include programming the first set of memory cells at 420 as described herein based on determining at 430 that the value of the counter satisfies the count threshold. For example, the controller may program the first set of memory cells with the first set of states associated with the first scrambled data. The seed used for scrambling the first set of data may also be stored in the first set of memory cells.

In some examples, the process flow 400 may include generating new scrambled data based on determining at 430 that the value of the counter does not satisfy the count threshold. For example, at 435, the controller may generate second scrambled data based on the first data and a second scrambling seed (e.g., a new random seed).

In some examples, the process flow 400 may include determining whether a new aggregate difference satisfies a threshold based on generating the new scrambled data at 435. For example, the controller may perform 415 as described herein using the new scrambled data generated at 435, which may include determining whether a second aggregate difference between a third set of states associated with the second scrambled data and the second set of states satisfies the threshold. The process flow 400 may then proceed from 415 as described herein. For example, at 420, the controller may program the first set of memory cells with the third set of states associated with the second scrambled data based on determining that the second aggregate difference does not satisfy the threshold.

Aspects of the process flow 400 may be implemented by a controller, among other components. Additionally, or alternatively, aspects of the process flow 400 may be implemented as instructions stored in memory (e.g., firmware stored in a memory coupled with the memory system controller 115 or the local controller 135). For example, the instructions, when executed by a controller (e.g., a memory system controller 115, a local controller 135), may cause the controller to perform the operations of the process flow 400.

Figure 5:
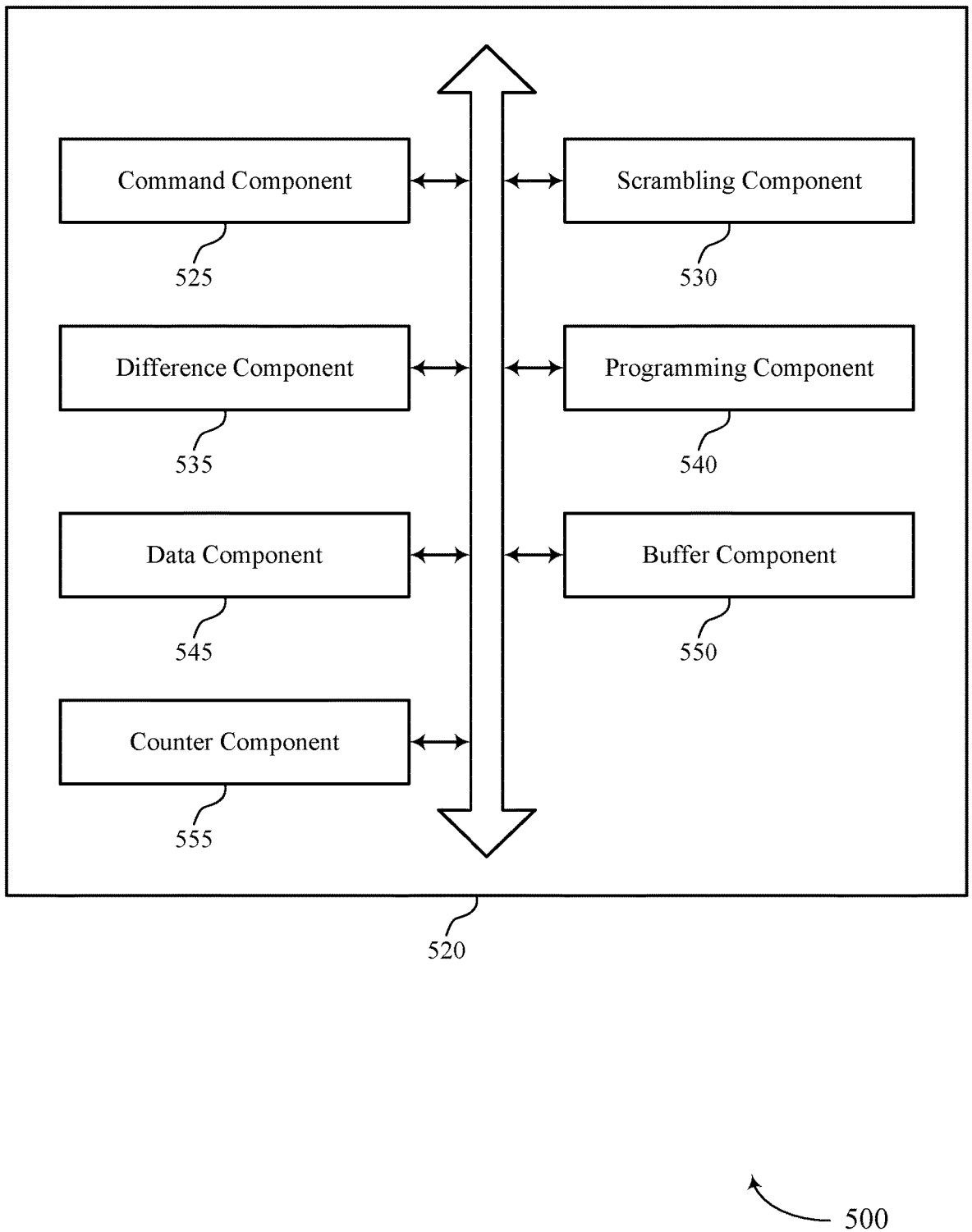
FIG. 5 shows a block diagram of a memory system that supports reducing charge migration in a memory system in accordance with examples as disclosed herein.

FIG. 5 shows a block diagram 500 of a memory system 520 that supports reducing charge migration in a memory system in accordance with examples as disclosed herein. The memory system 520 may be an example of aspects of a memory system as described with reference to FIGS. 1 through 4. The memory system 520, or various components thereof, may be an example of means for performing various aspects of reducing charge migration in a memory system as described herein. For example, the memory system 520)

may include a command component 525, a scrambling component 530), a difference component 535, a programming component 540), a data component 545, a buffer component 550, a counter component 555, or any combination thereof. Each of these components may communicate, directly or indirectly, with one another (e.g., via one or more buses).

The command component 525 may be configured as or otherwise support a means for receiving a command to program a first set of memory cells coupled with a first word line with first data, the command associated with programming each cell of the first set of memory cells to one of three or more states. The scrambling component 530 may be configured as or otherwise support a means for generating first scrambled data based at least in part on the first data and a first scrambling seed. The difference component 535 may be configured as or otherwise support a means for determining whether an aggregate difference between a first set of states associated with the first scrambled data and a second set of states associated with second data that is stored at a second set of memory cells coupled with a second word line satisfies a threshold. The programming component 540) may be configured as or otherwise support a means for programming the first set of memory cells with the first data based at least in part on the determining.

In some examples, the programming component 540 may be configured as or otherwise support a means for programming the first set of memory cells with the first set of states associated with the first scrambled data based at least in part on determining that the aggregate difference between the first set of states and the second set of states does not satisfy the threshold.

In some examples, the scrambling component 530 may be configured as or otherwise support a means for generating second scrambled data based at least in part on the first data and a second scrambling seed, where the second scrambled data is generated based at least in part on determining that the aggregate difference between the first set of states and the second set of states satisfies the threshold. In some examples, the difference component 535 may be configured as or otherwise support a means for determining whether a second aggregate difference between a third set of states associated with the second scrambled data and the second set of states satisfies the threshold.

In some examples, the programming component 540 may be configured as or otherwise support a means for programming the first set of memory cells with the third set of states associated with the second scrambled data based at least in part on determining that the second aggregate difference between the third set of states and the second set of states does not satisfy the threshold.

In some examples, the counter component 555 may be configured as or otherwise support a means for increasing a counter based at least in part on generating the second scrambled data. In some examples, the programming component 540 may be configured as or otherwise support a means for programming the first set of memory cells with the third set of states associated with the second scrambled data based at least in part on a value of the counter satisfying a count threshold.

In some examples, the data component 545 may be configured as or otherwise support a means for reading the second set of memory cells to determine the second set of states, where the aggregate difference is determined based at least in part on reading the second set of memory cells.

In some examples, the buffer component 550 may be configured as or otherwise support a means for storing the second data in a buffer. In some examples, the buffer component 550 may be configured as or otherwise support a means for reading the buffer to determine the second set of states, where the aggregate difference is determined based at least in part on reading the buffer.

In some examples, the command component 525 may be configured as or otherwise support a means for receiving, prior to receiving the command to program the first set of memory cells, a second command to program the second set of memory cells with the second data, where the second data is stored in the buffer based at least in part on receiving the second command.

In some examples, to support determining whether the aggregate difference satisfies the threshold, the difference component 535 may be configured as or otherwise support a means for determining a set of differences between respective states of the first set of states and respective states of the second set of states. In some examples, to support determining whether the aggregate difference satisfies the threshold, the difference component 535 may be configured as or otherwise support a means for determining the aggregate difference based at least in part on the set of differences.

In some examples, the difference component 535 may be configured as or otherwise support a means for applying a weighting function to the set of differences.

Figure 6:
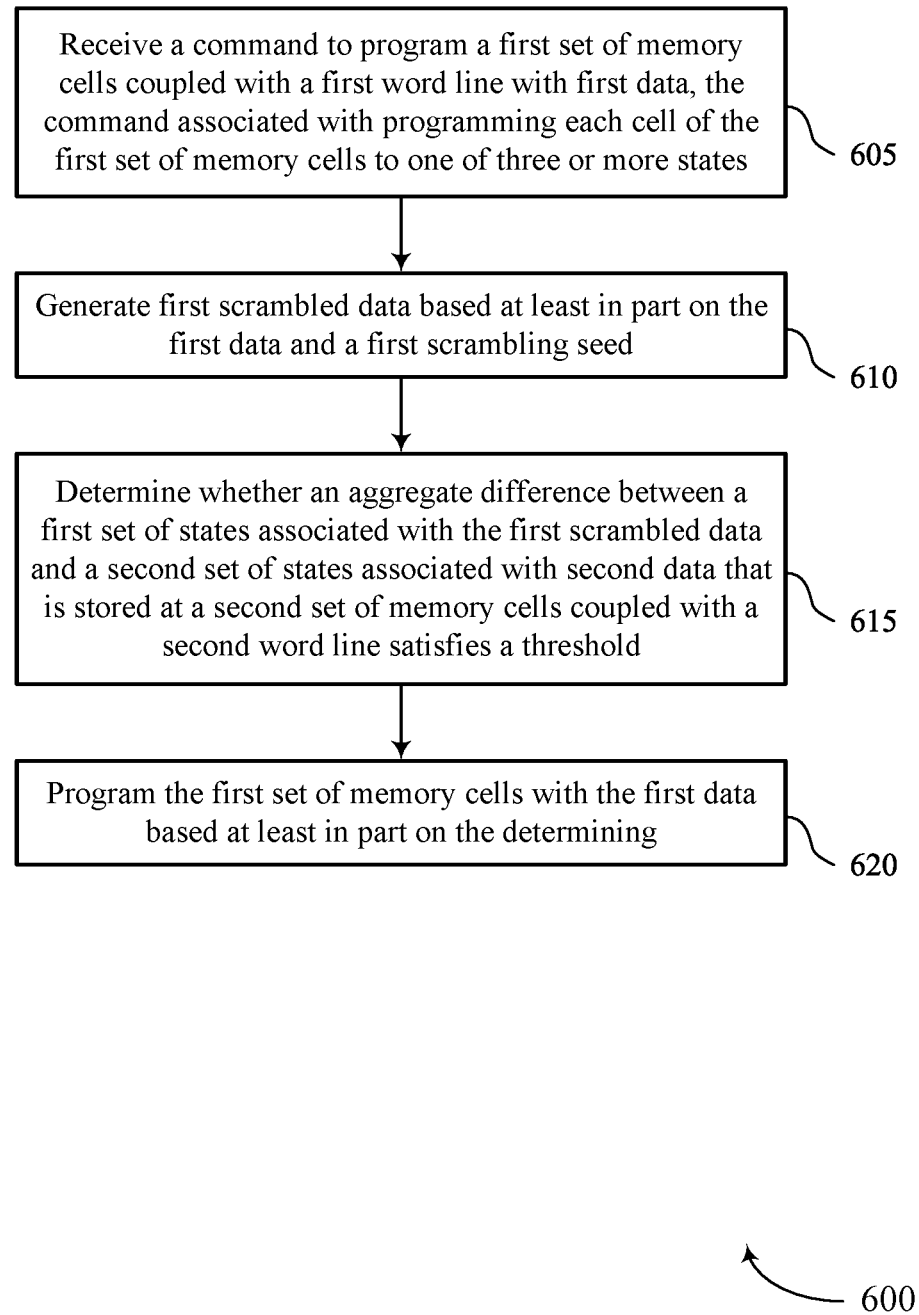
FIG. 6 shows a flowchart illustrating a method or methods that support reducing charge migration in a memory system in accordance with examples as disclosed herein.

FIG. 6 shows a flowchart illustrating a method 600 that supports reducing charge migration in a memory system in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving a command to program a first set of memory cells coupled with a first word line with first data, the command associated with programming each cell of the first set of memory cells to one of three or more states. The operations of 605 may be performed in accordance with examples as disclosed herein. In some examples, aspects of the operations of 605 may be performed by a command component 525 as described with reference to FIG. 5.

At 610, the method may include generating first scrambled data based at least in part on the first data and a first scrambling seed. The operations of 610 may be performed in accordance with examples as disclosed herein. In some examples, aspects of the operations of 610 may be performed by a scrambling component 530 as described with reference to FIG. 5.

At 615, the method may include determining whether an aggregate difference between a first set of states associated with the first scrambled data and a second set of states associated with second data that is stored at a second set of memory cells coupled with a second word line satisfies a threshold. The operations of 615 may be performed in accordance with examples as disclosed herein. In some examples, aspects of the operations of 615 may be performed by a difference component 535 as described with reference to FIG. 5.

At 620, the method may include programming the first set of memory cells with the first data based at least in part on the determining. The operations of 620 may be performed in accordance with examples as disclosed herein. In some examples, aspects of the operations of 620 may be performed by a programming component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command to program a first set of memory cells coupled with a first word line with first data, the command associated with programming each cell of the first set of memory cells to one of three or more states; generating first scrambled data based at least in part on the first data and a first scrambling seed; determining whether an aggregate difference between a first set of states associated with the first scrambled data and a second set of states associated with second data that is stored at a second set of memory cells coupled with a second word line satisfies a threshold; and programming the first set of memory cells with the first data based at least in part on the determining.

Aspect 2: The method, apparatus, or non-transitory computer-readable medium of aspect 1, further including operations, features, circuitry, logic, means, or instructions, or any combination thereof for programming the first set of memory cells with the first set of states associated with the first scrambled data based at least in part on determining that the aggregate difference between the first set of states and the second set of states does not satisfy the threshold.

Aspect 3: The method, apparatus, or non-transitory computer-readable medium of any of aspects 1 through 2, further including operations, features, circuitry, logic, means, or instructions, or any combination thereof for generating second scrambled data based at least in part on the first data and a second scrambling seed, where the second scrambled data is generated based at least in part on determining that the aggregate difference between the first set of states and the second set of states satisfies the threshold and determining whether a second aggregate difference between a third set of states associated with the second scrambled data and the second set of states satisfies the threshold.

Aspect 4: The method, apparatus, or non-transitory computer-readable medium of aspect 3, further including operations, features, circuitry, logic, means, or instructions, or any combination thereof for programming the first set of memory cells with the third set of states associated with the second scrambled data based at least in part on determining that the second aggregate difference between the third set of states and the second set of states does not satisfy the threshold.

Aspect 5: The method, apparatus, or non-transitory computer-readable medium of any of aspects 3 through 4, further including operations, features, circuitry, logic, means, or instructions, or any combination thereof for increasing a counter based at least in part on generating the second scrambled data and programming the first set of memory cells with the third set of states associated with the second scrambled data based at least in part on a value of the counter satisfying a count threshold.

Aspect 6: The method, apparatus, or non-transitory computer-readable medium of any of aspects 1 through 5, further including operations, features, circuitry, logic, means, or instructions, or any combination thereof for reading the second set of memory cells to determine the second set of states, where the aggregate difference is determined based at least in part on reading the second set of memory cells.

Aspect 7: The method, apparatus, or non-transitory computer-readable medium of any of aspects 1 through 6, further including operations, features, circuitry, logic, means, or instructions, or any combination thereof for storing the second data in a buffer and reading the buffer to determine the second set of states, where the aggregate difference is determined based at least in part on reading the buffer.

Aspect 8: The method, apparatus, or non-transitory computer-readable medium of aspect 7, further including operations, features, circuitry, logic, means, or instructions, or any combination thereof for receiving, prior to receiving the command to program the first set of memory cells, a second command to program the second set of memory cells with the second data, where the second data is stored in the buffer based at least in part on receiving the second command.

Aspect 9: The method, apparatus, or non-transitory computer-readable medium of any of aspects 1 through 8, where determining whether the aggregate difference satisfies the threshold includes operations, features, circuitry, logic, means, or instructions, or any combination thereof for determining a set of differences between respective states of the first set of states and respective states of the second set of states and determining the aggregate difference based at least in part on the set of differences.

Aspect 10: The method, apparatus, or non-transitory computer-readable medium of aspect 9, further including operations, features, circuitry, logic, means, or instructions, or any combination thereof for applying a weighting function to the set of differences.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: a controller associated with a memory system, where the controller is configured to cause the apparatus to: receive a command to program a first set of memory cells coupled with a first word line with first data, the command associated with programming each cell of the first set of memory cells to one of three or more states; generate first scrambled data based at least in part on the first data and a first scrambling seed; determine whether an aggregate difference between a first set of states associated with the first scrambled data and a second set of states associated with second data that is stored at a second set of memory cells coupled with a second word line satisfies a threshold; and program the first set of memory cells with the first data based at least in part on the determining.

Aspect 12: The apparatus of aspect 11, where the controller is further configured to cause the apparatus to: program the first set of memory cells with the first set of states associated with the first scrambled data based at least in part on determining that the aggregate difference between the first set of states and the second set of states does not satisfy the threshold.

Aspect 13: The apparatus of any of aspects 11 through 12, where the controller is further configured to cause the apparatus to: generate second scrambled data based at least in part on the first data and a second scrambling seed, where the second scrambled data is generated based at least in part on determining that the aggregate difference between the first set of states and the second set of states satisfies the threshold; and determine whether a second aggregate difference between a third set of states associated with the second scrambled data and the second set of states satisfies the threshold.

Aspect 14: The apparatus of aspect 13, where the controller is further configured to cause the apparatus to: program the first set of memory cells with the third set of states associated with the second scrambled data based at least in part on determining that the second aggregate difference between the third set of states and the second set of states does not satisfy the threshold.

Aspect 15: The apparatus of any of aspects 13 through 14, where the controller is further configured to cause the apparatus to: increase a counter based at least in part on generating the second scrambled data; and program the first set of memory cells with the third set of states associated with the second scrambled data based at least in part on a value of the counter satisfying a count threshold.

Aspect 16: The apparatus of any of aspects 11 through 15, where the controller is further configured to cause the apparatus to: read the second set of memory cells to determine the second set of states, where the aggregate difference is determined based at least in part on reading the second set of memory cells.

Aspect 17: The apparatus of any of aspects 11 through 16, where the controller is further configured to cause the apparatus to: store the second data in a buffer; read the buffer to determine the second set of states, where the aggregate difference is determined based at least in part on reading the buffer.

Aspect 18: The apparatus of aspect 17, where the controller is further configured to cause the apparatus to: receive, prior to receiving the command to program the first set of memory cells, a second command to program the second set of memory cells with the second data, where the second data is stored in the buffer based at least in part on receiving the second command.

Aspect 19: The apparatus of any of aspects 11 through 18, where, to whether the aggregate difference satisfies the threshold, the controller is further configured to cause the apparatus to: determine a set of differences between respective states of the first set of states and respective states of the second set of states; and determine the aggregate difference based at least in part on the set of differences.

Aspect 20: The apparatus of aspect 19, where the controller is further configured to cause the apparatus to: apply a weighting function to the set of differences.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a controller associated with a memory system, wherein the controller is configured to cause the apparatus to:
receive a command to program a first set of memory cells coupled with a first word line with first data, the command associated with programming each cell of the first set of memory cells to one of three or more states;
generate first scrambled data based at least in part on the first data and a first scrambling seed;
determine whether an aggregate difference between a first set of states associated with the first scrambled data and a second set of states associated with second data that is stored at a second set of memory cells coupled with a second word line satisfies a threshold; and
program the first set of memory cells with the first data based at least in part on the determining.

2. The apparatus of claim 1, wherein the controller is further configured to cause the apparatus to:
program the first set of memory cells with the first set of states associated with the first scrambled data based at least in part on determining that the aggregate difference between the first set of states and the second set of states does not satisfy the threshold.

3. The apparatus of claim 1, wherein the controller is further configured to cause the apparatus to:
generate second scrambled data based at least in part on the first data and a second scrambling seed, wherein the second scrambled data is generated based at least in part on determining that the aggregate difference between the first set of states and the second set of states satisfies the threshold; and
determine whether a second aggregate difference between a third set of states associated with the second scrambled data and the second set of states satisfies the threshold.

4. The apparatus of claim 3, wherein the controller is further configured to cause the apparatus to:
program the first set of memory cells with the third set of states associated with the second scrambled data based at least in part on determining that the second aggregate difference between the third set of states and the second set of states does not satisfy the threshold.

5. The apparatus of claim 3, wherein the controller is further configured to cause the apparatus to:
increase a counter based at least in part on generating the second scrambled data; and
program the first set of memory cells with the third set of states associated with the second scrambled data based at least in part on a value of the counter satisfying a count threshold.

6. The apparatus of claim 1, wherein the controller is further configured to cause the apparatus to:
read the second set of memory cells to determine the second set of states, wherein the aggregate difference is determined based at least in part on reading the second set of memory cells.

7. The apparatus of claim 1, wherein the controller is further configured to cause the apparatus to:
store the second data in a buffer; and
read the buffer to determine the second set of states, wherein the aggregate difference is determined based at least in part on reading the buffer.

8. The apparatus of claim 7, wherein the controller is further configured to cause the apparatus to:
receive, prior to receiving the command to program the first set of memory cells, a second command to program the second set of memory cells with the second data, wherein the second data is stored in the buffer based at least in part on receiving the second command.

9. The apparatus of claim 1, wherein, to determine whether the aggregate difference satisfies the threshold, the controller is further configured to cause the apparatus to:
determine a set of differences between respective states of the first set of states and respective states of the second set of states; and
determine the aggregate difference based at least in part on the set of differences.

10. The apparatus of claim 9, wherein the controller is further configured to cause the apparatus to:
apply a weighting function to the set of differences.

11. A non-transitory computer-readable medium storing code comprising instructions which, when executed by a processor of an electronic device, cause the electronic device to:
receive a command to program a first set of memory cells coupled with a first word line with first data, the command associated with programming each cell of the first set of memory cells to one of three or more states;
generate first scrambled data based at least in part on the first data and a first scrambling seed;
determine whether an aggregate difference between a first set of states associated with the first scrambled data and a second set of states associated with second data that is stored at a second set of memory cells coupled with a second word line satisfies a threshold; and
program the first set of memory cells with the first data based at least in part on the determining.

12. The non-transitory computer-readable medium of claim 11, wherein
the instructions, when executed by the processor of the electronic device, further cause the electronic device to:
program the first set of memory cells with the first set of states associated with the first scrambled data based at least in part on determining that the aggregate difference between the first set of states and the second set of states does not satisfy the threshold.

13. The non-transitory computer-readable medium of claim 11, wherein the instructions, when executed by the processor of the electronic device, further cause the electronic device to:
generate second scrambled data based at least in part on the first data and a second scrambling seed, wherein the second scrambled data is generated based at least in part on determining that the aggregate difference between the first set of states and the second set of states satisfies the threshold; and determine whether a second aggregate difference between a third set of states associated with the second scrambled data and the second set of states satisfies the threshold.

14. The non-transitory computer-readable medium of claim 13, wherein
the instructions, when executed by the processor of the electronic device, further cause the electronic device to:
program the first set of memory cells with the third set of states associated with the second scrambled data based at least in part on determining that the second aggregate difference between the third set of states and the second set of states does not satisfy the threshold.

15. The non-transitory computer-readable medium of claim 13, wherein the instructions, when executed by the processor of the electronic device, further cause the electronic device to:
increase a counter based at least in part on generating the second scrambled data; and
program the first set of memory cells with the third set of states associated with the second scrambled data based at least in part on a value of the counter satisfying a count threshold.

16. The non-transitory computer-readable medium of claim 11, wherein
the instructions, when executed by the processor of the electronic device, further cause the electronic device to:
read the second set of memory cells to determine the second set of states, wherein the aggregate difference is determined based at least in part on reading the second set of memory cells.

17. The non-transitory computer-readable medium of claim 11, wherein the instructions, when executed by the processor of the electronic device, further cause the electronic device to:
store the second data in a buffer; and
read the buffer to determine the second set of states, wherein the aggregate difference is determined based at least in part on reading the buffer.

18. The non-transitory computer-readable medium of claim 17, wherein the instructions, when executed by the processor of the electronic device, further cause the electronic device to:
receive, prior to receiving the command to program the first set of memory cells, a second command to program the second set of memory cells with the second data, wherein the second data is stored in the buffer based at least in part on receiving the second command.

19. The non-transitory computer-readable medium of claim 11, wherein, to determine whether the aggregate difference satisfies the threshold, the instructions, when executed by the processor of the electronic device, further cause the electronic device to:
determine a set of differences between respective states of the first set of states and respective states of the second set of states; and
determine the aggregate difference based at least in part on the set of differences.

20. A method, comprising:
receiving a command to program a first set of memory cells coupled with a first word line with first data, the command associated with programming each cell of the first set of memory cells to one of three or more states;
generating first scrambled data based at least in part on the first data and a first scrambling seed;
determining whether an aggregate difference between a first set of states associated with the first scrambled data and a second set of states associated with second data that is stored at a second set of memory cells coupled with a second word line satisfies a threshold; and
programming the first set of memory cells with the first data based at least in part on the determining.

* * * * *